US012093234B2

(12) United States Patent
Huang et al.

(10) Patent No.: US 12,093,234 B2
(45) Date of Patent: Sep. 17, 2024

(54) DATA PROCESSING METHOD, APPARATUS, ELECTRONIC DEVICE, AND COMPUTER STORAGE MEDIUM

(71) Applicant: Alibaba Group Holding Limited, Grand Cayman (KY)

(72) Inventors: Gui Huang, Hangzhou (CN); Canfang Shang, Hangzhou (CN); Dengcheng He, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 159 days.

(21) Appl. No.: 17/538,748

(22) Filed: Nov. 30, 2021

(65) Prior Publication Data
US 2022/0083522 A1 Mar. 17, 2022

Related U.S. Application Data

(63) Continuation of application No. PCT/CN2020/091526, filed on May 21, 2020.

(30) Foreign Application Priority Data

May 30, 2019 (CN) .......................... 201910462532.X (51) Int. Cl.
*G06F 16/22* (2019.01)
*G06F 16/215* (2019.01)
*G06F 16/25* (2019.01)

(52) U.S. Cl.
CPC ........ *G06F 16/2228* (2019.01); *G06F 16/215* (2019.01)

(58) Field of Classification Search
CPC .... G06F 16/2228; G06F 16/215; G06F 16/25; G06F 16/23
See application file for complete search history.

(56) References Cited

U.S. PATENT DOCUMENTS 9,846,711 B2 * 12/2017 Borthakur ............... G06F 16/23
10,346,432 B2 7/2019 Lipcon
(Continued)

FOREIGN PATENT DOCUMENTS

CN 103744617 A 4/2014
CN 104809237 A 7/2015
(Continued)

OTHER PUBLICATIONS

Translation of International Search Report mailed Aug. 29, 2020, from corresponding PCT Application No. PCT/CN2020/091526, 2 pages.

(Continued)

*Primary Examiner* — Kris E Mackes
*Assistant Examiner* — Cecile H Vo
(74) *Attorney, Agent, or Firm* — Lee & Hayes, P.C.

(57) ABSTRACT

A data processing method including: acquiring information of multiple first data blocks of a first level to be merged and information of multiple second data blocks of a second level to be merged, wherein each of the first data blocks of the first level has the same first size, and each of the second data blocks of the second level has the same second size; performing, according to the information of the multiple first data blocks and the information of the multiple second data blocks, data comparison on each of the first data blocks and each of the second data blocks; and performing, according to a comparison result, data compaction on the first level and the second level. The embodiments of the present disclosure effectively reduce system overheads caused by I/O data read and write and data comparison, thereby improving the system throughput.

15 Claims, 7 Drawing Sheets

(56) References Cited

U.S. PATENT DOCUMENTS

| | | | |
|---|---|---|---|
| 10,445,022 B1* | 10/2019 | Qui | G06F 3/0661 |
| 10,474,656 B1 | 11/2019 | Bronnikov | |
| 10,706,106 B2 | 7/2020 | Boles et al. | |
| 10,795,871 B2 | 10/2020 | Velayudhan Pillai et al. | |
| 10,909,102 B2 | 2/2021 | Wang et al. | |
| 11,100,071 B2 | 8/2021 | Tomlinson et al. | |
| 11,675,789 B2* | 6/2023 | Shatsky | G06F 16/2246 |
| | | | 707/609 |
| 2010/0235333 A1* | 9/2010 | Bates | G06F 16/1748 |
| | | | 711/E12.001 |
| 2013/0148227 A1 | 6/2013 | Tofano | |
| 2017/0364414 A1* | 12/2017 | Pogosyan | G06F 16/9027 |
| 2018/0307711 A1 | 10/2018 | Kulkarni et al. | |
| 2018/0349095 A1 | 12/2018 | Wu et al. | |
| 2019/0026340 A1* | 1/2019 | Boehme | G06F 16/24544 |
| 2019/0278504 A1* | 9/2019 | Matsui | G06F 3/0608 |
| 2019/0332329 A1* | 10/2019 | Qui | G06F 3/0679 |
| 2020/0117744 A1 | 4/2020 | Tomlinson | |
| 2020/0183905 A1* | 6/2020 | Wang | G06F 16/2246 |
| 2020/0334295 A1 | 10/2020 | Boles et al. | |
| 2021/0019257 A1* | 1/2021 | Shu | G06F 16/215 |
| 2022/0358019 A1* | 11/2022 | Grunwald | G06F 11/1469 |

FOREIGN PATENT DOCUMENTS

| | | |
|---|---|---|
| CN | 105808169 A | 7/2016 |
| CN | 108572788 A | 8/2018 |

OTHER PUBLICATIONS

Translation of Written Opinion mailed Aug. 29, 2020, from corresponding PCT Application No. PCT/CN2020/091526, 4 pages.

English Translation of Chinese First Office Action dated Jul. 15, 2023 for corresponding Chinese Application No. 201910462532, 6 pages.

English Translation of Chinese First Search Report dated Jul. 15, 2023 for corresponding Chinese application No. 201910462532, 1 page.

English Translation of Chinese Second Office Action dated Feb. 9, 2024 for corresponding Chinese Application No. 201910462532, 6 pages.

* cited by examiner

ACQUIRE INFORMATION OF MULTIPLE FIRST DATA BLOCKS OF FIRST LEVEL TO BE MERGED AND INFORMATION OF MULTIPLE SECOND DATA BLOCKS OF SECOND LEVEL TO BE MERGED
S102

PERFORM, ACCORDING TO INFORMATION OF MULTIPLE FIRST DATA BLOCKS AND INFORMATION OF MULTIPLE SECOND DATA BLOCKS, DATA COMPARISON ON EACH OF FIRST DATA BLOCKS AND EACH OF SECOND DATA BLOCKS
S104

PERFORM, ACCORDING TO COMPARISON RESULT, DATA COMPACTION ON FIRST LEVEL AND SECOND LEVEL
S106

FIG. 1

GENERATE LEVEL INDEXES OF LSM STRUCTURE ACCORDING TO INFORMATION OF EACH DATA BLOCK OF EACH LEVEL OF LSM STRUCTURE AND INFORMATION OF EACH DATA FILE FORMED BY DATA BLOCKS
S202

ACQUIRE, ACCORDING TO LEVEL INDEXES CORRESPOND TO LSM STRUCTURE, INFORMATION OF MULTIPLE FIRST DATA BLOCKS OF FIRST LEVEL TO BE MERGED AND INFORMATION OF MULTIPLE SECOND DATA BLOCKS OF SECOND LEVEL TO BE MERGED
S204

PERFORM, ACCORDING TO INFORMATION OF MULTIPLE FIRST DATA BLOCKS AND INFORMATION OF MULTIPLE SECOND DATA BLOCKS, DATA COMPARISON ON EACH OF FIRST DATA BLOCKS AND EACH OF SECOND DATA BLOCKS
S206

PERFORM, ACCORDING TO COMPARISON RESULT, DATA COMPACTION ON FIRST LEVEL AND SECOND LEVEL
S208

DATA PROCESSING METHOD, APPARATUS, ELECTRONIC DEVICE, AND COMPUTER STORAGE MEDIUM

CROSS REFERENCE TO RELATED APPLICATIONS

This application claims priority to and is a continuation of PCT Patent Application No. PCT/CN2020/091526, filed on 21 May 2020 and entitled "DATA PROCESSING METHOD, APPARATUS, ELECTRONIC DEVICE, AND COMPUTER STORAGE MEDIUM," which claims priority to Chinese patent application No. 201910462532.X filed on 30 May 2019 and entitled "DATA PROCESSING METHOD, APPARATUS, ELECTRONIC DEVICE, AND COMPUTER STORAGE MEDIUM," which are incorporated herein by reference in their entirety.

TECHNICAL FIELD

The present disclosure relates to the technical field of logistics, and, more particularly, relates to a data processing method, apparatus, electronic device, and computer storage medium.

BACKGROUND

A database is a collection of data stored together in a certain manner. Generally speaking, databases can be classified as relational databases, such as MySQL, or non-relational databases, such as MongoDB and the like. With development of computer technology, the amount of data that needs to be stored is increasing at an exponential rate, and higher requirements are imposed on the performance of databases in terms of data management, read-write access, etc. To meet the requirements, some databases (such as X-DB databases, LevelDB databases, RocksDB databases, etc.) adopt the LSM (Log Structured Merge-Trees) structure.

In a database adopting the LSM structure, a data write (including insert, update, delete, etc.) is always performed by writing data into a memory table (memtable) in an append manner, and the data does not overwrite original lines having the identical content. When the memory table is appended to a certain size (e.g., 1 GB), the memory table is dumped to a persistent storage (e.g., a magnetic disk). However, data of each dump may have an overlapping range with respect to the data of the previous dump, especially in cases where updates and deletions are frequently performed. The LSM structure sees data of each dump as one level. As the number of dumps increases, the number of levels also increases. A read operation requires all of the levels to be read and data to be merged. Therefore, an increase in the number of levels leads to poor query efficiency, and more duplicate data between levels causes more waste of space.

Thus, the LSM structure requires regular data compaction operations to merge data levels having overlapping data into sequential data levels without overlapping, and to discard old version data that is no longer referenced. The procedure of such operations includes reading two levels of data to be merged, performing merge sorting, discarding data in old version according to a rule, and writing a merge result.

However, the merging process above consumes a lot of I/O resources to read and write data, and CPU resources are also needed for data comparison, which has an impact on system performance. In particular, in high load conditions, starting a data compaction task will cause the system throughput to plummet.

SUMMARY

The embodiments of the present disclosure provide a data processing solution to solve the above-mentioned technical problems.

According to a first example embodiment of the present disclosure, a data processing method is provided, comprising: acquiring information of multiple first data blocks of a first level to be merged and information of multiple second data blocks of a second level to be merged, wherein each of the data blocks of the first level has the same first size, and each of the data blocks of the second level has the same second size; performing, according to the information of the multiple first data blocks and the information of the multiple second data blocks, data comparison on each of the first data blocks and each of the second data blocks; and performing, according to a comparison result, data compaction on the first level and the second level.

According to a second example embodiment of the present disclosure, a data processing apparatus is provided, comprising: an acquisition module, configured to acquire information of multiple first data blocks of a first level to be merged and information of multiple second data blocks of a second level to be merged, wherein each of the data blocks of the first level has the same first size, and each of the data blocks of the second level has the same second size; a comparison module, configured to perform, according to the information of the multiple first data blocks and the information of the multiple second data blocks, data comparison on each of the first data blocks and each of the second data blocks; and a merging module, configured to perform, according to a comparison result, data compaction on the first level and the second level.

According to a third example embodiment of the present disclosure, an electronic device is provided, comprising: a processor, a memory, a communication interface, and a communication bus, wherein the processor, the memory, and the communication interface communicate with one another through the communication bus; the memory is configured to store at least one executable instruction, and the executable instruction causes the processor to perform an operation corresponding to the data processing method according to the first aspect.

According to a fourth example embodiment of the present disclosure, a computer storage medium is provided and has a computer program stored thereon. When executed by a processor, the program performs the data processing method according to the first aspect.

According to the data processing solution provided by the embodiments of the present disclosure, a data block is used as a unit, fixed-sized data blocks are used to store data at each level of data storage, and data compaction of adjacent levels is achieved by comparing data blocks of the adjacent levels to be merged. On the one hand, since the size of a data block is generally smaller than that of a data file, the probability of data overlapping is significantly lower for data blocks at adjacent levels. As data blocks without overlapping do not need a data compaction procedure for overlapping data that involves data read, data compaction, and data write, the lower data overlapping probability effectively reduces the system overheads caused by I/O data read and write and data comparison, thereby improving the system throughput. On the other hand, since data blocks of each level have a fixed size, size determination and acquisition do not need to be performed for each data block, thereby greatly improving the data processing speed and efficiency.

BRIEF DESCRIPTION OF DRAWINGS

In order to explain the embodiments of the present disclosure or the technical solutions in the prior art more clearly, the accompanying drawings to be used in the description of the embodiments or the prior art will be briefly introduced below. Apparently, the drawings described below are merely some embodiments listed in the embodiments of the present disclosure. For those of ordinary skills in the art, other drawings may be further derived from these drawings.

DESCRIPTION OF EMBODIMENTS

In order to enable those skilled in the art to better understand the technical solutions in the embodiments of the present disclosure, the technical solutions in the embodiments of the present disclosure will be described in connection with the accompanying drawings of the embodiments of the present disclosure. Apparently, the described embodiments are merely some, instead of all, of the embodiments of the present disclosure. All other embodiments derived from the embodiments in the detailed description of the present disclosure by those of ordinary skills in the art should be considered as falling within the scope of protection of the embodiments of the present disclosure.

The specific implementation of the embodiments of the present disclosure will be further described below in connection with the accompanying drawings of the embodiments of the present disclosure.

In the following, the data processing solutions provided by the present disclosure are explained through a plurality of embodiments with an example of using an LSM structure for data storage. However, those skilled in the art would understand that other LSM-like structures storing and merging data in a hierarchical manner may be applied to the solutions provided in the embodiments of the present disclosure.

Figure 1:
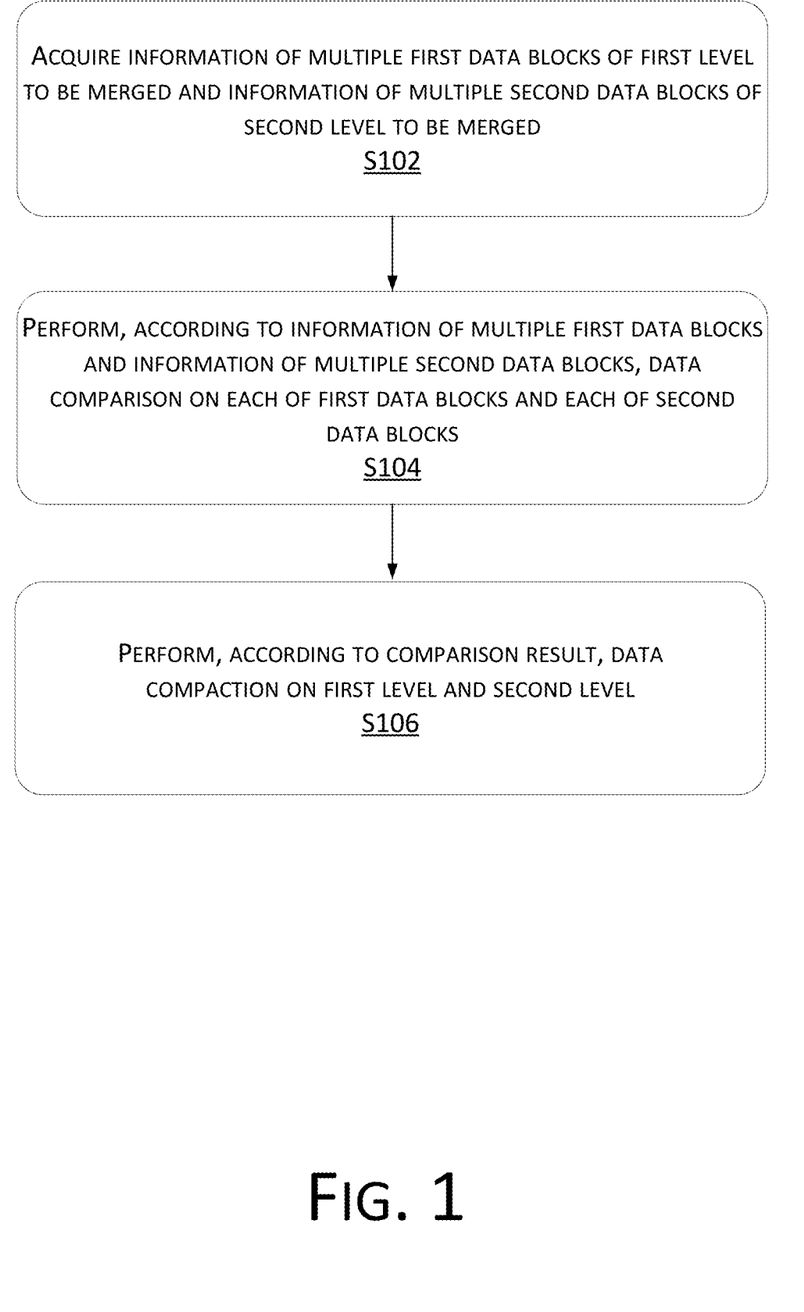
FIG. 1 is a flow chart showing the steps of a data processing method according to an embodiment of the present disclosure.

Referring to FIG. 1, the figure shows a flow chart of the steps of a data processing method according to an embodiment of the present disclosure.

The data processing method of this embodiment includes the following steps.

Step S102: acquiring information of multiple first data blocks of a first level to be merged and information of multiple second data blocks of a second level to be merged.

Each of the data blocks of the first level has the same first size, and each of the data blocks of the second level has the same second size.

An LSM structure is used as an example. Unlike conventional LSM structures, the LSM structure of the embodiment of the present disclosure uses fixed-sized data blocks at each level to store data, such that a data overlapping probability is reduced when a data compaction operation of two adjacent levels is performed.

It should be noted that "first level" and "second level" in the embodiments of the present disclosure are any two adjacent levels to be merged, and are merely used to describe and distinguish levels instead of specifically referring to a certain level or two certain levels. For example, a certain LSM structure has 5 levels, LEVEL1-LEVEL5. Assuming LEVEL1 is the bottom-most level and LEVEL5 is the top-most level, the first level may be LEVEL1, and then the second level is LEVEL2; or the first level is LEVEL2, and the second level is LEVEL3, and so on.

The information of each data block may include information of a level where the data block is located, information about data contained in the data block, location information of the data block, and the like.

As mentioned above, data blocks at each level have the same size, and the sizes of data blocks at different levels may be different. In general, it is recommended that the size of a lower level is smaller than the size of an upper level. However, it should be noted that for LSM structures having a large number of levels, the maximum size of data blocks thereof should be set to enable a data overlapping probability to be lower than a reference value. The specific reference value could be determined by those skilled in the art according to actual requirements, for example, setting the value at 5%. Alternatively, the maximum size of data blocks may be set to, for example, 16 M. For such LSM structures having a large number of levels, if the data block size at a certain level has reached the maximum size or the data overlapping probability has reached the preset probability, the maximum size may simply be used for data blocks at a lower level without a further size increase to ensure effective control of the data overlapping probability and processing. In addition, if the data block size at a certain level has reached the minimum size, size reduction may not be required for data blocks at an upper level. For example, if the first level is a lower level with respect to the second level, the first size may be larger than the second size; conversely, if the first level is a higher level with respect to the second level, the first size may be smaller than the second size. In addition, in some cases, the first size and the second size may be the same (for example, the first level is a lower level with respect to the second level and the second size has reached the preset maximum size, or the first level is a higher level with respect to the second level, and the second size has reached the preset minimum size, and the like).

Step S104: performing, according to the information of the multiple first data blocks and the information of the multiple second data blocks, data comparison on each of the first data blocks and each of the second data blocks.

Information of data contained in a data block may be obtained according to the information of the data block. Accordingly, data comparison may be performed on data blocks contained in the first level, i.e., the multiple first data blocks, and data blocks contained in the second level, i.e., the multiple second data blocks, so as to determine whether the multiple first data blocks and the multiple second data blocks have a data block having overlapped data.

Step S106: performing, according to a comparison result, data compaction on the first level and the second level.

After data comparison is performed on the multiple first data blocks and the multiple second data blocks, a comparison result is obtained, including whether there are data blocks having overlapped data, which data blocks are such data blocks, and the like. Furthermore, data compaction of the first level and the second level may be performed accordingly. For example, overlapping data in the data blocks having overlapped data may be merged, and the like.

Through this embodiment, a data block is used as a unit, each level of data storage uses fixed-sized data blocks to store data, and data compaction of adjacent levels is achieved by comparing data blocks of adjacent levels to be merged. On the one hand, since the size of a data block is generally smaller than that of a data file, the probability of data overlapping is significantly lower for data blocks at adjacent levels. As data blocks without overlapping do not need a data compaction procedure for overlapping data that involves data read, data compaction, and data write, the lower data overlapping probability effectively reduces the system overheads caused by I/O data read and write and data comparison, thereby improving the system throughput. On the other hand, since data blocks of each level have a fixed size, size determination and acquisition do not need to be performed for each data block, thereby greatly improving the data processing speed and efficiency.

The data processing method of this embodiment may be executed by any suitable electronic device having a data processing capability. The electronic device includes, but is not limited to, a server, a mobile terminal (such as a mobile phone, a PDA, etc.), a PC, etc.

Figure 2:
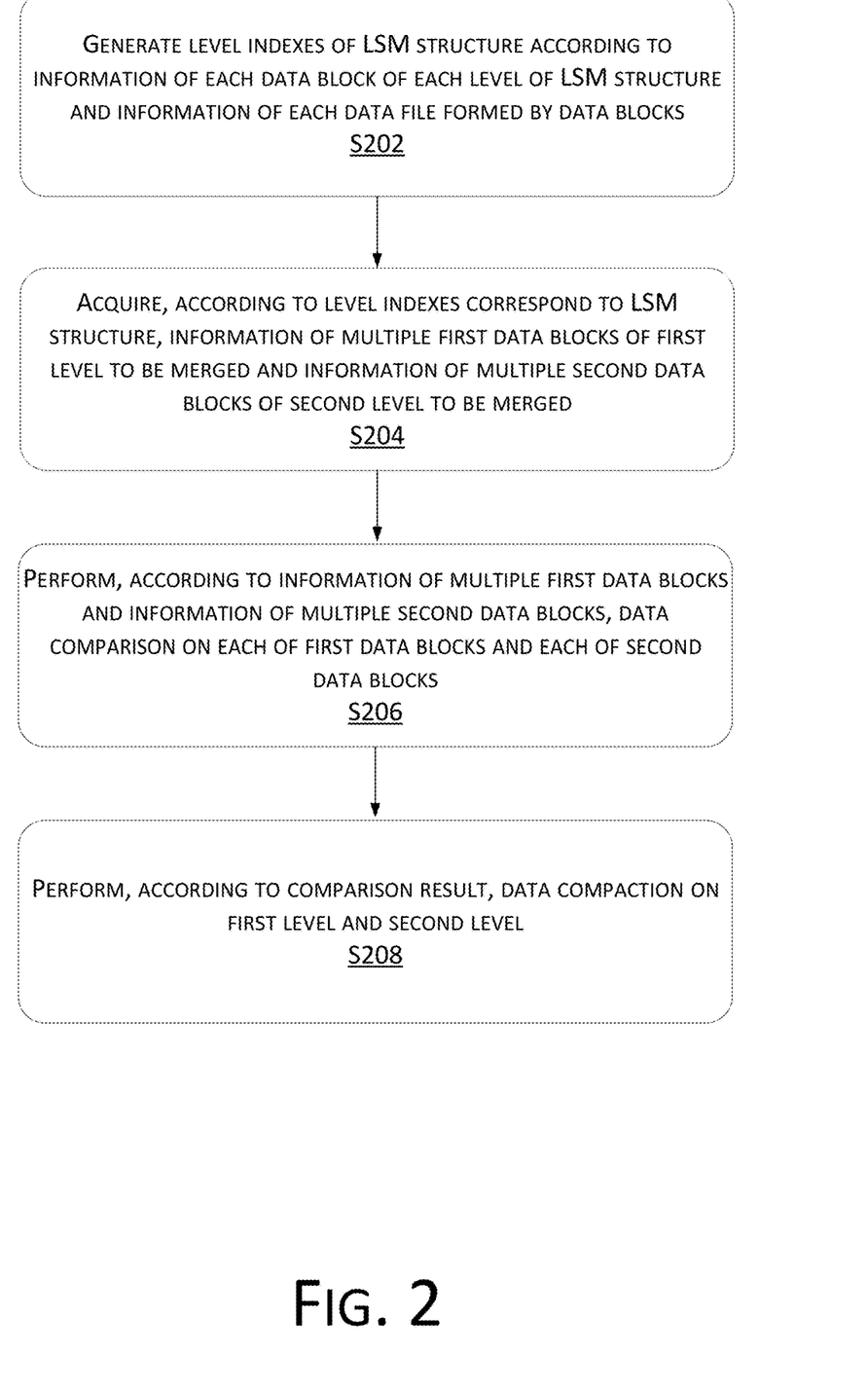
FIG. 2 is a flow chart showing the steps of a data processing method according to an embodiment of the present disclosure.

Referring to FIG. 2, the figure shows a flow chart of the steps of a data processing method according to Embodiment II of the present disclosure.

The data processing method of this embodiment includes the following steps.

Step S202: generating level indexes of an LSM structure according to information of each data block at each level of the LSM structure and information of each data file formed by data blocks.

This embodiment still takes an LSM structure as an example. The LSM structure adopts a level index format. In each level, the unit of data storage is a data block, and data blocks at the level may be further organized as a data file. Data blocks at different levels may have different sizes, but the size of data blocks in one data file is fixed.

The information of each data block may include, but is not limited to, information of the level where the data block is located, information of data contained in the data block, location information of the data block, and the like. The information of each data file includes, but is not limited to, information of the level where the data file is located, information of data blocks contained in the data file, location information of the data file, and the like.

Figure 3:
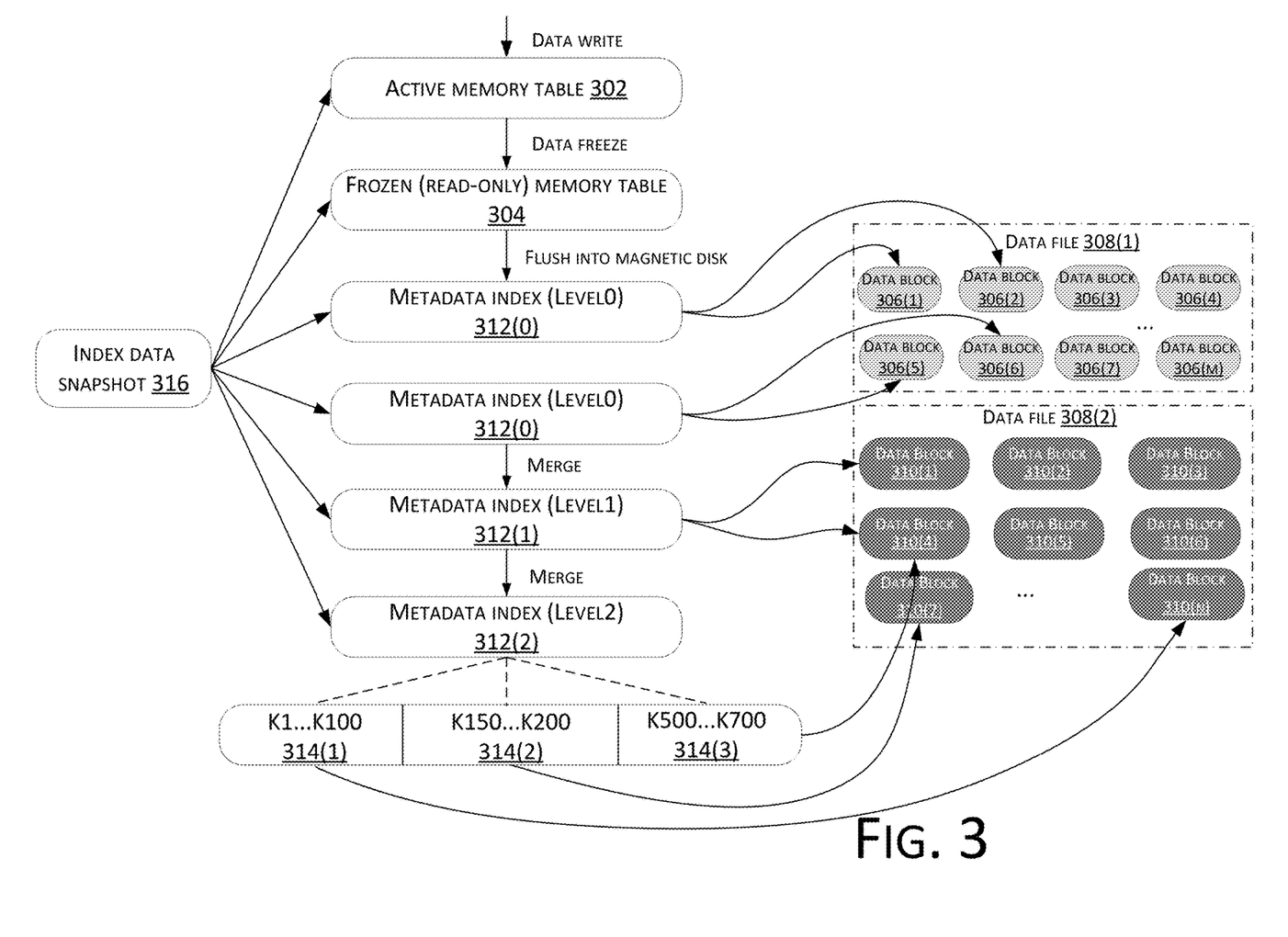
FIG. 3 is a schematic diagram of level indexes of an LSM structure in the embodiment shown in FIG. 2.

An example of level indexes of an LSM structure is shown in FIG. 3, and data of the LSM structure is indexed by the level index structure in a memory as shown in FIG. 3. It can be seen from FIG. 3 that written data is appended to a memory table referred to as the "active memory table (active memtable)" 302. When the written data reaches a certain volume, the active memory table is frozen and becomes a "frozen memory table," 304 which is ready to be written to a magnetic disk. The frozen memory table 304 may be read-only. On the magnetic disk, data of each level is stored in fixed-sized "data blocks (also known as extents)," and these data blocks are organized as data files.

For example, data blocks 306(1), 306(2), 306(3), 306(4), 306(5), 306(6), 306(7), . . . and 306(m) are formed into data file 308(1). Data blocks 310(1), 310(2), 310(3), 310(4), 310(5), 310(6), 310(7), . . . and 310(n) are formed into data file 308(2). m and n may be any integer.

The dashed blocks in FIG. 3 show the relationship between data blocks and data files, which clearly indicate that each data file is composed of multiple data blocks. In FIG. 3, whether it is an index corresponding to LEVEL0 such as metadata index (level 0) 312(0), an index corresponding to LEVEL1 such as metadata index (level 1) 312(1), or an index corresponding to LEVEL2 such as metadata index (level 2) 312(2), all the indexes can be correspondingly indexed to corresponding data blocks. Unlike the conventional generation of indexes for data files, an index corresponding to data blocks is generated in the embodiment of the present disclosure, so as to enable fast and convenient data queries. For example, at the metadata index (level 2) 312(2), the data block index 314(1) K1 . . . K100 corresponds to the data block 310(n), the data block index 314(2) K150 . . . K200 corresponds to the data block 310(7), the data block index 314(3) K500 . . . K700 corresponds to the data block 310(7).

In addition, data blocks and data files of different levels are effectively indexed by means of generating level indexes according to information of data blocks, thereby improving the efficiency of data queries and management. FIG. 3 illustrates such index data snapshot 316.

Step S204: acquiring, according to the level indexes corresponding to the LSM structure, information of multiple first data blocks of a first level to be merged and information of multiple second data blocks of a second level to be merged.

In this embodiment, the second level is set as a higher level adjacent to the first level. However, as mentioned above, the use of "first" and "second," is only for distinguishing and describing two adjacent levels. In practical applications, they may also be used in a reversed manner, which is not specifically limited by the embodiments of the present disclosure.

Based on the level indexes generated in step S202, in this embodiment, the level indexes are used as the basis for acquiring information of each corresponding data block in the two levels to be merged. The level indexes enable fast queries and acquisition of the information of a corresponding data block.

Herein, each of the data blocks of the first level has the same first size, and each of the data blocks of the second level has the same second size. In this embodiment, based on the setting that the second level is a higher level adjacent to the first level, the second size is smaller than the first size.

When configuring a fixed size of corresponding data blocks for each level of the LSM structure, it is necessary to make the data overlapping probability between data blocks of two adjacent levels meet a preset probability. The specific value of the preset probability may be suitably configured by those skilled in the art according to actual requirements, as long as the system overheads of data compaction operations are controlled to be within a desired range. In practical applications, configuring the specific size of the data blocks enables the data overlapping probability to meet the preset probability. Therefore, in this embodiment, the first size corresponding to each first data block and the second size corresponding to each second data block are both sizes that meet the preset data overlapping probability. For example, both the first size and the second size have a size range of 2-16 M.

In addition, for example, each first data block and each second data block may be divided into data pages of a preset size according to a preset rule. In this embodiment, the data page is configured as the basic unit of data reading. The preset rule and the preset size may be suitably configured by those skilled in the art according to actual requirements, for example, a rule of whether data pages in data blocks at each level have a consistent size, a rule of how data page dividing changes from a high level to a low level, the preset size of data pages being configured as 16 KB, and the like.

For example, in the LSM structure, data at each level is stored in fixed-sized data blocks (extents), and these data blocks are organized as data files. Data blocks at different levels have different sizes, but data blocks in a data file have a fixed size. The minimum size is 2 MB, and the maximum size is 16 MB. Take LEVEL0, LEVEL1, and LEVEL2 shown in FIG. 3 as an example. The levels may be configured as, from bottom to top, LEVEL0 having a corresponding data block size of 16 M, LEVEL1 having a corresponding data block size of 4 M, and LEVEL2 having a corresponding data block size of 2 M. Typically, data files and data blocks of a higher level are more likely to be accessed. Therefore, the data block size may decrease from a lower level to a higher level. An excessively small data block size, however, tends to lead to a large number of indexes and index complexity. A data block size greater than a certain threshold, on the other hand, causes the data overlapping probability to increase. Therefore, in this example, the size range of data blocks in the LSM structure is set to be 2-16 M, which ensures that the data overlapping probability remains at a small value and indexes corresponding to the LSM structure are kept at a normal data volume and space level.

Furthermore, each data block stores therein a specific data row, and sorting is performed according to the primary key column in the data row. On this basis, the data blocks may be further divided into data pages according to a fixed size, and the size is 16 KB or smaller. The data pages are used as the basic unit of data reading to achieve subsequent efficient and fast data reading.

Step S206: performing, according to the information of the multiple first data blocks and the information of the multiple second data blocks, data comparison on each of the first data blocks and each of the second data blocks.

An LSM structure-based data compaction operation is to merge data at different levels that has an overlapping (or coinciding) data range, and then write the merged data to the higher level. Since data is stored in the unit of data blocks in the embodiments of the present disclosure, whether data overlapping occurs between two adjacent levels to be merged may be determined by comparing data blocks of these two levels.

For example, if the data blocks are read by using a data page as a unit, this step may be implemented as: reading, according to the information of the multiple first data blocks and the information of the multiple second data blocks, data of each of the first data blocks and data of each of the second data blocks by using the data page as a unit; and performing, according to a reading result, data comparison on each of the first data blocks and each of the second data blocks. Since data is read by using the data page as a unit, the data may be further compared by using the data page as a unit. If data of two data pages overlap, it means that the data blocks corresponding to the two data pages also have overlapped data. At this time point, the remaining data in the corresponding two data blocks does not need to be read. In this way, the data reading and comparison efficiency is improved, and system costs are reduced.

Step S208: performing, according to a comparison result, data compaction on the first level and the second level.

The step includes determining, according to the comparison result, data blocks having overlapped data from the multiple first data blocks at the first level and the multiple second data blocks at the second level; and merging a first data block having overlapped data with an overlapping second data block, and reusing, in the second level, a first data block without overlapping.

For example, in the case where there are five data blocks, A1, A2, A3, A4, and A5 at the first level, and seven data blocks, B1, B2, B3, B4, B5, B6, and B7 at the second level, if the comparison result indicates that A1 and B1 have data overlapping, A2 and B2 have data overlapping, A4 and B5 have data overlapping, and A5 and B7 have data overlapping, then data compaction is needed for A1 and B1, A2 and B2, A4 and B5, and A5 and B7. A3 may be directly reused in the second level.

Apparently, the data block-based storage manner facilitates data storage, reading, and management, as well as greatly improves the data compaction efficiency and reduces the system overheads due to data compaction.

In an alternative manner, the merging the first data block having overlapped data with the overlapping second data block may include: determining whether a data gap meeting a preset criteria exists in data of the first data block having overlapped data; if so, dividing, according to the data gap, the first data block into at least two data blocks, and then performing merging with the second data block; and if not, directly merging the first data block with the second data block. The preset criteria could be suitably configured by those skilled in the art according to actual requirements. For example, the criteria may be configured as a gap between data rows being capable of accommodating a physical structure (such as a data page, a data block, etc.), configured as data in a current data row being spaced apart from data in a next data row by a certain data range, or the like. For some data blocks having relatively sparse data rows, splitting the data blocks into multiple data blocks enables some of the split data blocks to be fully reused, thereby further improving the data compaction speed and efficiency.

By contrast, the conventional solutions include selecting a data file at level 1, then finding an overlapping range between level 2 and level 1, performing merging for the overlapping range, and writing the result into level 2. As data files in the conventional LSM structure in the above solutions do not have a fixed size, each level has its own data file size threshold. A data file at a lower level at a boundary of a data row has a larger size, which is typically above 64 MB. As such a conventional LSM structure has a large data file, the data overlapping probability is high when data compaction operations are performed. For example, even if there is only one overlapping entry between data of 64 MB level 1 and data of 64 BM level 2, the two data files must be read and parsed as data rows, which are then merged, and the resulting 128 MB data is rewritten. In the data processing solution provided by this embodiment, however, a data file is divided into fixed-sized data blocks having a small size, and therefore, the data overlapping probability between different levels is reduced. During a merging process, a data block without overlapping does not have to undergo the process of read, merge, and write. Instead, the merging process may be completed by directly modifying an index of this data block, which is referred to as "data reusing/data reuse." For example, since data page is used as the basic unit of data reading in this embodiment, the data reusing may be further applied to the data pages. That is, if a data page is found to be without overlapping during a merging process, data of this data page may be directly reused.

Figure 4:
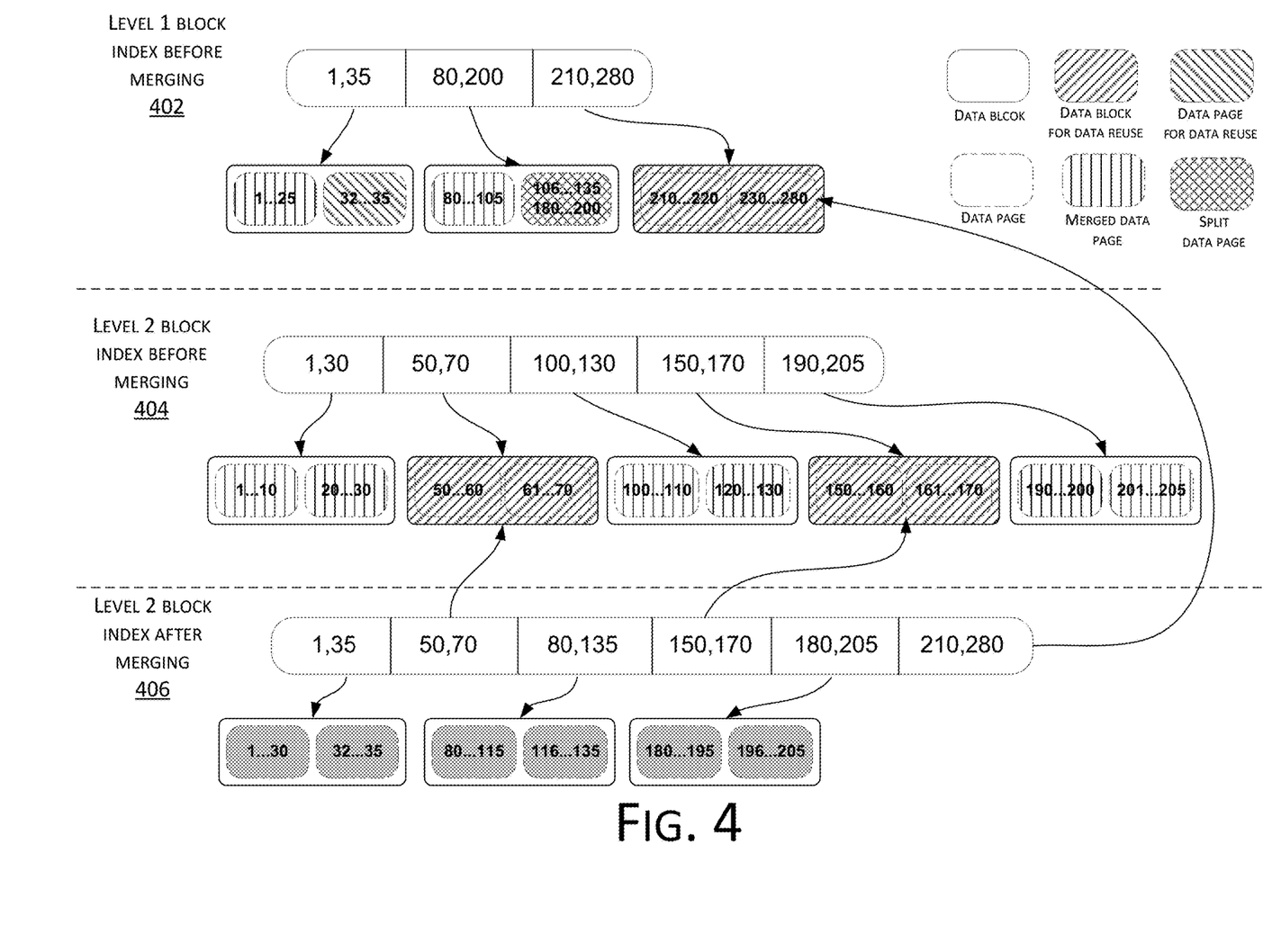
FIG. 4 is a schematic diagram of a data compaction procedure in the embodiment shown in FIG. 2.

An example of a data compaction process of two levels is shown in FIG. 4. The process includes iterating through data of each level; whenever a boundary of a physical structure (such as the boundary of a data block or the boundary of a data page) is encountered, whether data at a level is overlapped with data at another level is determined; and if negative, reusing the entire physical structure (such as the entire data block or the entire data page). As shown in FIG. 4, it illustrates the level 1 block index before merging 402, the level 2 block index before merging 404, and the level 2 block index after merging 406. The data compaction is performed on range [1, 280] (comprising 3 extents) of the first level (i.e., level 1L1) and range [1, 205] (comprising 5 extents) of the second level (i.e., level 2L2).

The first data page DataBlock [1, 35] in Extent 1 of L1 has overlapped data with respect to the two DataBlock in Extent 1 of L2. After the merging takes place, a new extent (as shown in the first data page in the bottom row in FIG. 4) is written. The second DataBlock [32, 35] in Extent 1 of L1 does not have overlapped data with data blocks of L2, and therefore may be directly copied to a new extent (as shown in the second data page in the bottom row in FIG. 4) without being merged with the data blocks of L2. The other data blocks of L1 and L2 are individually processed in a similar fashion to achieve merging of data pages and data blocks.

It should be noted that although the second DataBlock [106, 200] in Extent 2 of L1 overlaps with all of the last three extents in L2, it is detected that the data page has sparse data rows (no data between 135 and 180) during the actual iterative process. The data page is thus split into two data blocks, i.e., [106, 135] and [180, 200]. After the split, the data in [106, 135] is merged with the third Extent [100, 130] of L2, and the data in [180, 200] is merged with the last Extent [190, 205] of L2. The entirety of the fourth Extent [150, 170] of L2 may be reused.

In general service scenarios, written data generally has hotspots and is localized, which means some data is updated frequently while most data remain unchanged. Therefore, setting data blocks of each level at a reasonable size greatly increases the probability of data reuse. Taking Taobao transactions as an example, if the solution provided in this embodiment is used, the probability of data reuse is 95% in day-to-day situations, which, when compared with the conventional structures, reduces more than 5-fold of I/O overheads during the data compaction process.

This embodiment uses a data block as a unit, stores data in fixed-sized data blocks at each level of the LSM structure and performs data compaction of adjacent levels by comparing data blocks of adjacent levels to be merged. On the one hand, since the size of a data block is generally smaller than that of a data file, the probability of data overlapping is significantly lower for data blocks at adjacent levels. As data blocks without overlapping do not need a data compaction procedure for overlapping data that involves data read, data compaction, and data write, the lower data overlapping probability effectively reduces the system overheads caused by I/O data read and write and data comparison, thereby improving the system throughput. On the other hand, since data blocks of each level of the LSM structure have a fixed size, size determination and acquisition do not need to be performed for each data block, thereby greatly improving the data processing speed and efficiency.

The data processing method of this embodiment may be executed by any suitable electronic device having a data processing capability. The electronic device includes, but is not limited to, a server, a mobile terminal (such as a mobile phone, a PDA, etc.), a PC, etc.

Figure 5:
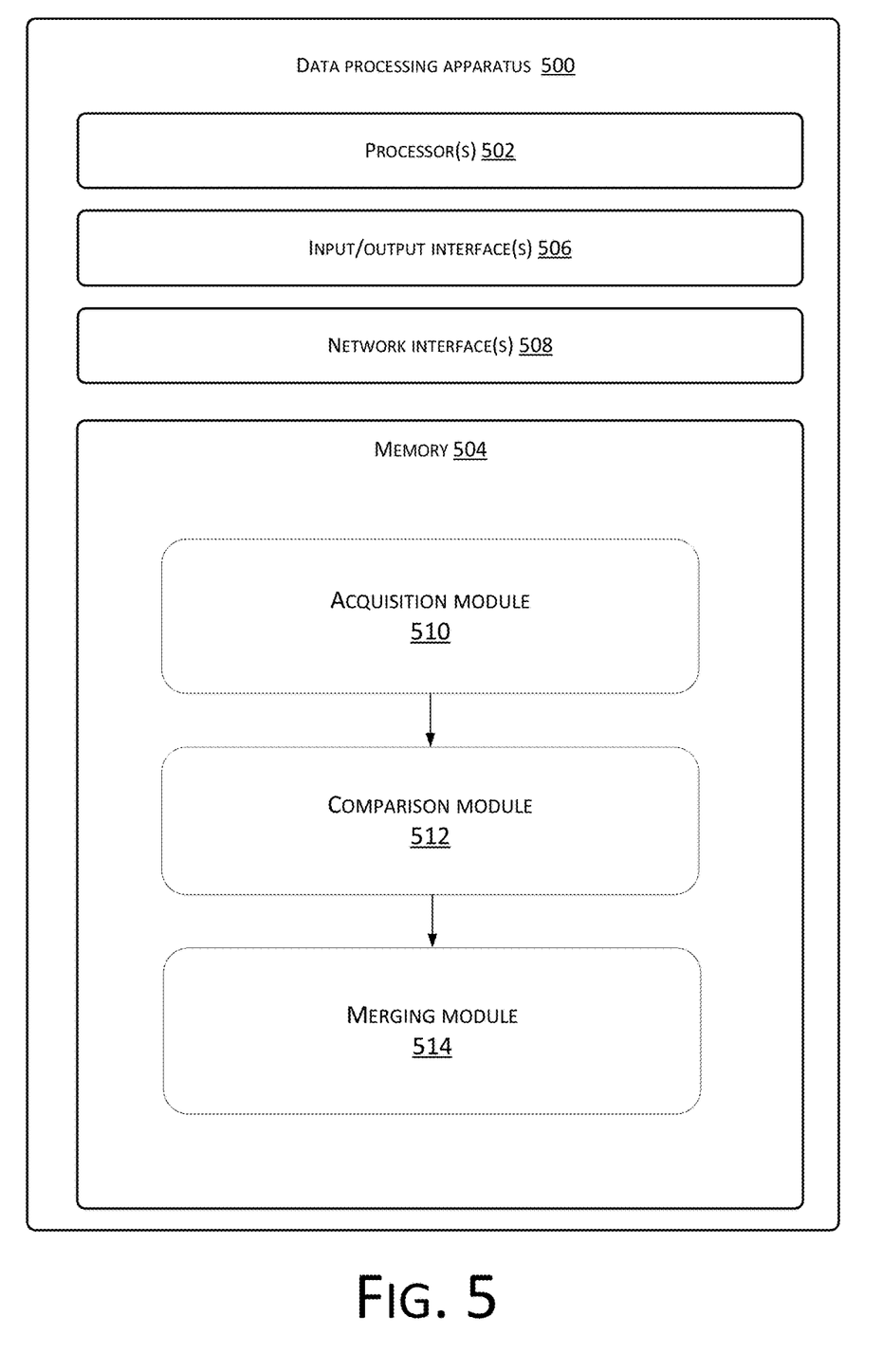
FIG. 5 is a structural block diagram of a data processing apparatus according to an embodiment of the present disclosure.

Referring to FIG. 5, the figure shows a structural block diagram of a data processing apparatus 500 according to an embodiment of the present disclosure.

As shown in FIG. 5, the data processing apparatus 500 includes one or more processor(s) 502 or data processing unit(s) and memory 504. The data processing apparatus 500 may further include one or more input/output interface(s) 506 and one or more network interface(s) 508.

The memory 504 is an example of computer readable media. The computer readable media include non-volatile and volatile media as well as movable and non-movable media and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media or transitory media such as a modulated data signal and carrier.

The memory 504 may store therein a plurality of modules or units including:
 an acquisition module 510, configured to acquire information of multiple first data blocks of a first level to be merged and information of multiple second data blocks of a second level to be merged, wherein each of the data blocks of the first level has the same first size, and each of the data blocks of the second level has the same second size;
 a comparison module 512, configured to perform, according to the information of the multiple first data blocks and the information of the multiple second data blocks, data comparison on each of the first data blocks and each of the second data blocks; and
 a merging module 514, configured to perform, according to a comparison result, data compaction on the first level and the second level.

The data processing apparatus in this embodiment is used to implement the corresponding data processing methods in the foregoing multiple method embodiments, and has the beneficial effects of the corresponding method embodiments, which are not further elaborated herein. In addition, for the functional implementation of each module in the data processing apparatus of this embodiment, references may be made to the description of the corresponding portion in the foregoing method embodiments, which is not further elaborated herein.

Figure 6:
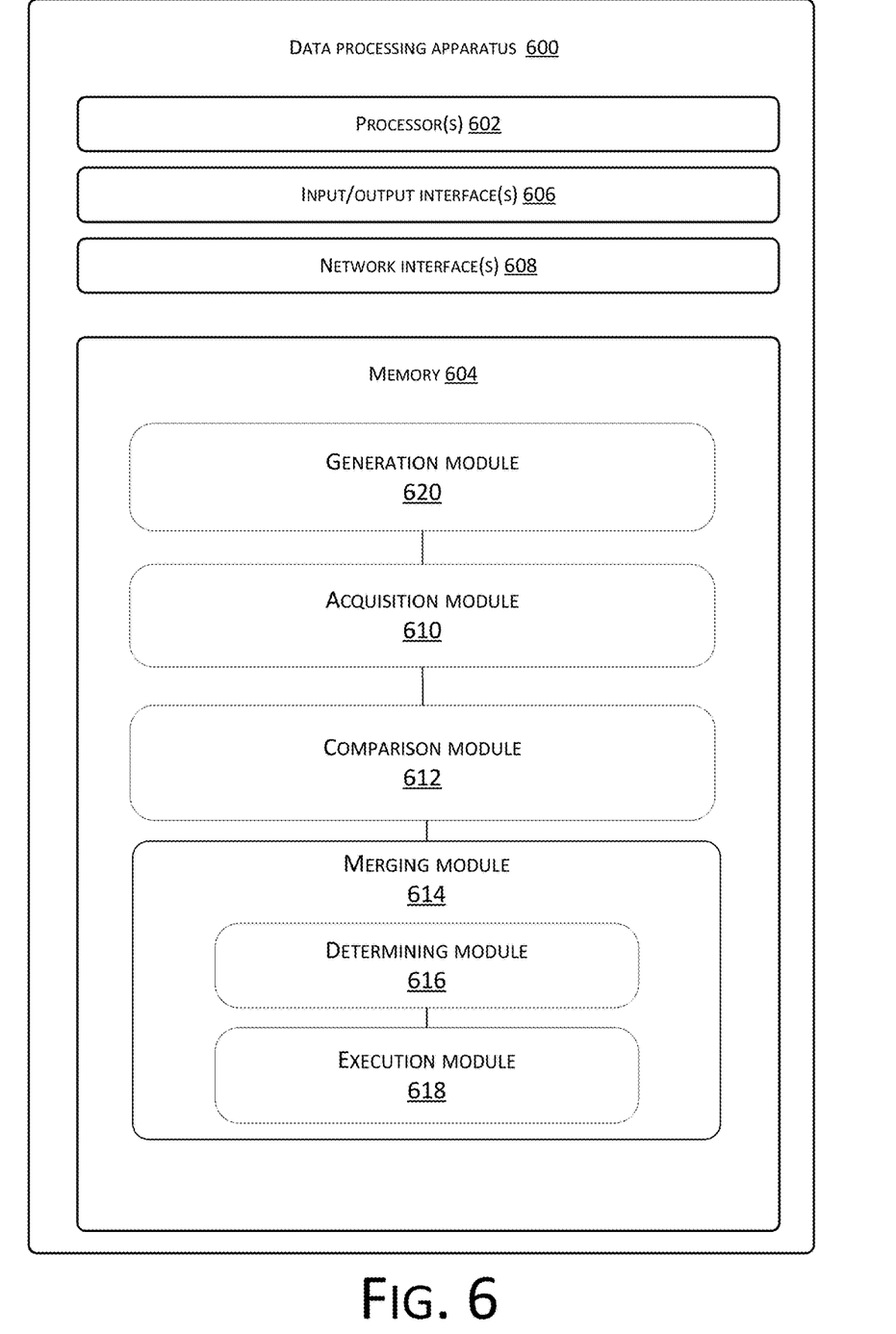
FIG. 6 is a structural block diagram of a data processing apparatus according to an embodiment of the present disclosure.

Referring to FIG. 6, this figure shows a structural block diagram of a data processing apparatus 600 according to an embodiment of the present disclosure.

As shown in FIG. 6, the data processing apparatus 600 includes one or more processor(s) 602 or data processing unit(s) and memory 604. The data processing apparatus 600 may further include one or more input/output interface(s) 606 and one or more network interface(s) 608.

The memory 604 is an example of computer readable media. The memory 604 may store therein a plurality of modules or units including:

an acquisition module 610, configured to acquire information of multiple first data blocks of a first level to be merged and information of multiple second data blocks of a second level to be merged, wherein each of the data blocks of the first level has the same first size, and each of the data blocks of the second level has the same second size;

a comparison module 612, configured to perform, according to the information of the multiple first data blocks and the information of the multiple second data blocks, data comparison on each of the first data blocks and each of the second data blocks; and a merging module 614, configured to perform, according to a comparison result, data compaction on the first level and the second level.

For example, the second level is a higher level adjacent to the first level, and the second size is smaller than the first size.

For example, the merging module 614 includes: a determining module 616, configured to determine, according to the comparison result, whether data overlapping exists between the multiple first data blocks and the multiple second data blocks; and an execution module 618, configured to merge a first data block having overlapped data with an overlapping second data block, and reuse, in the second level, a first data block without overlapping.

For example, the execution module 618 is configured to: determine whether a data gap meeting a preset criteria exists in data of the first data block having overlapped data; if so, divide, according to the data gap, the first data block into at least two data blocks, and then perform merging with the second data block; if not, directly merge the first data block with the second data block; and reuse, in the second level, a first data block without overlapping.

For example, both the first size and the second size are sizes that meet the preset data overlapping probability.

For example, both the first size and the second size have a size range of 2-16 M.

For example, both the first data blocks and the second data blocks are divided into data pages of a preset size according to a preset rule. The comparison module 404 is configured to read, according to the information of the multiple first data blocks and the information of the multiple second data blocks, data of each of the first data blocks and data of each of the second data blocks by using the data page as a unit, and perform, according to a reading result, data comparison on each of the first data blocks and each of the second data blocks.

For example, the acquisition module 610 is configured to acquire, according to level indexes (such as the level indexes corresponding to the LSM structure), the information of the multiple first data blocks of the first level to be merged and the information of the multiple second data blocks of the second level to be merged.

For example, the data processing apparatus 600 of this embodiment further includes: a generation module 620 stored on the memory 604 configured to generate the level indexes according to information of each data block at each level (such as information of each data block at each level of the LSM structure) and information of each data file formed by the data blocks.

The data processing apparatus 600 in this embodiment is used to implement the corresponding data processing methods in the foregoing multiple method embodiments, and has the beneficial effects of the corresponding method embodiments, which are not further elaborated herein. In addition, for the functional implementation of each module in the data processing apparatus of this embodiment, references may be made to the description of the corresponding portion in the foregoing method embodiments, which is not further elaborated herein.

Figure 7:
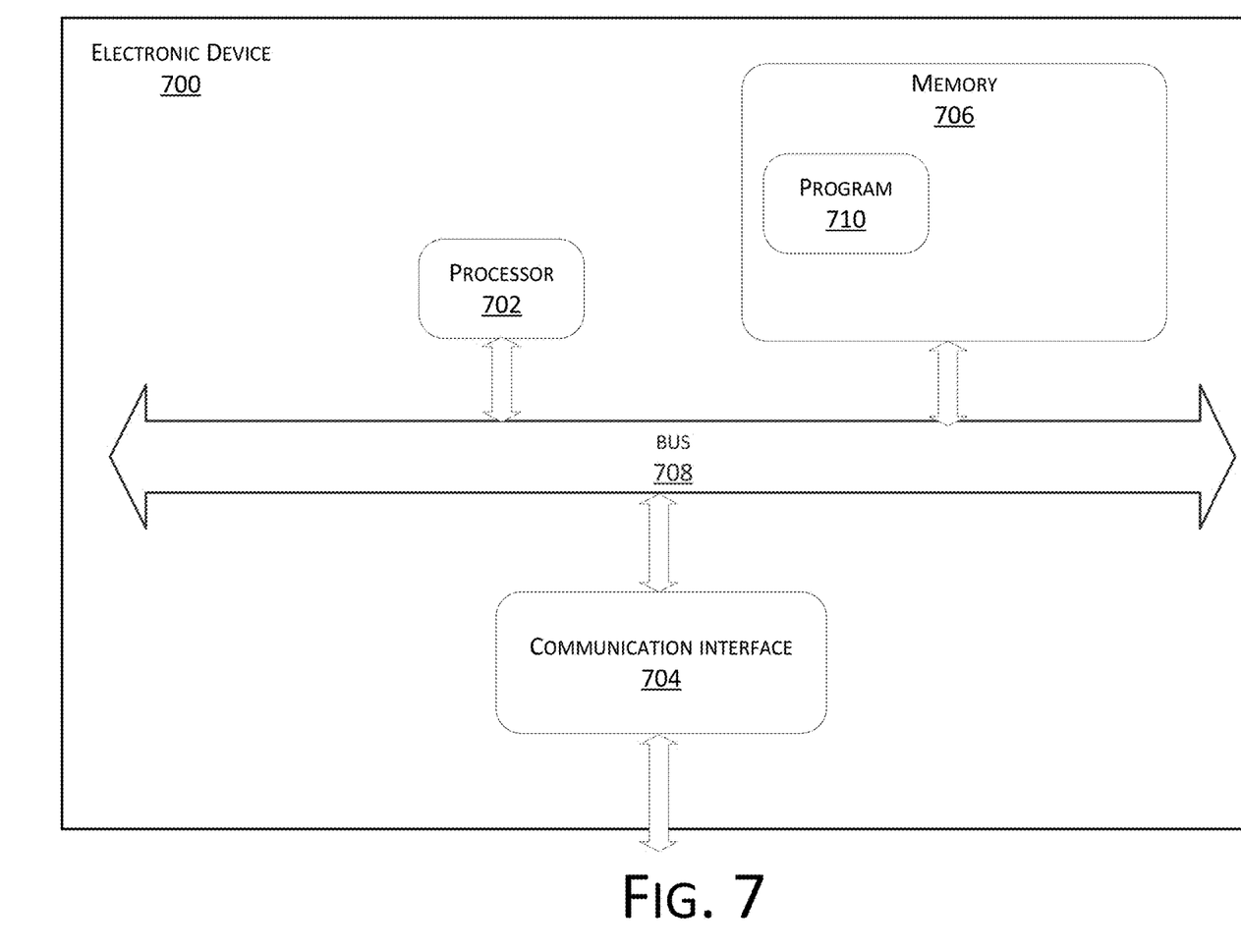
FIG. 7 is a schematic structural diagram of an electronic device according to an embodiment of the present disclosure.

Referring to FIG. 7, the figure shows a schematic structural diagram of an electronic device according to an embodiment of the present disclosure. The specific embodiment of the present disclosure does not limit the specific implementation of the electronic device.

As shown in FIG. 7, the electronic device may include: a processor 702, a communication interface 704, a memory 706, and a communication bus 708

The processor 702, the communication interface 704, and the memory 706 communicate with one another through the communication bus 708.

The communication interface 704 is configured to communicate with other electronic devices or servers.

The processor 702 is configured to execute a program 710, which executes the steps in the above-mentioned data processing method embodiments.

For example, the program 710 may include program code, and the program code includes computer-executable instructions.

The processor 702 may be a central processing unit (CPU), or an application-specific integrated circuit (ASIC) or configured as one or more integrated circuits for implementing the embodiments of the present disclosure. One or more processors included in a smart apparatus may be the same type of processors, such as one or more CPUs, or may be different types of processors, such as one or more CPUs and one or more ASICs.

The memory 706 is configured to store the program 710. The memory 706 may include a high-speed RAM memory, and may also further include a non-volatile memory, for example, at least one magnetic disk storage device.

The program 710 may specifically be configured to enable the processor 702 to perform the following operations: acquiring information of multiple first data blocks of a first level to be merged and information of multiple second data blocks of a second level to be merged, wherein each of the data blocks of the first level has the same first size, and each of the data blocks of the second level has the same second size; performing, according to the information of the multiple first data blocks and the information of the multiple second data blocks, data comparison on each of the first data blocks and each of the second data blocks; and performing, according to a comparison result, data compaction on the first level and the second level.

In an example implementation, the second level is a higher level adjacent to the first level, and the second size is smaller than the first size.

In an example implementation, the program 710 is further configured to enable the processor(s) 502 to perform the following operations during the performing data compaction on the first level and second level according to the comparison result: determining, according to the comparison result, whether data overlapping exists between the multiple first data blocks and the multiple second data blocks; and merging a first data having overlapped data with an overlapping second data block, and reusing, in the second level, a first data block without overlapping.

In an example implementation, the program 710 is further configured to enable the processor 702 to perform the following operations during the merging the first data block having overlapped data with the overlapping second data block: determining whether a data gap meeting a preset criteria exists in data in the first data block having overlapped data; if so, dividing, according to the data gap, the first data block into at least two data blocks, and then performing merging with the second data block; and if not, directly merging the first data block with the second data block.

In an example implementation, both the first size and the second size are sizes that meet the preset data overlapping probability.

In an example implementation, both the first size and the second size have a size range of 2-16 M.

In an example implementation, both the first data blocks and the second data blocks are divided into data pages of a preset size according to a preset rule; the program 710 is further configured to enable the processor(s) 502 to perform the following operations during the performing, according to the information of the multiple first data blocks and the information of the multiple second data blocks, data comparison on each of the first data blocks and each of the second data blocks: reading, according to the information of the multiple first data blocks and the information of the multiple second data blocks, data of each of the first data blocks and data of each of the second data blocks by using the data page as a unit; and performing, according to a reading result, data comparison on each of the first data blocks and each of the second data blocks.

The program 710 is further configured to enable the processor 702 to perform the following operations during acquiring, from the LSM structure, the information of the multiple first data blocks of the first level to be merged and the information of the multiple second data of the second level to be merged: acquiring, according to level indexes (such as the level indexes corresponding to the LSM structure), the information of the multiple first data blocks of the first level to be merged and the information of the multiple second data blocks of the second level to be merged.

The program 710 is further configured to enable the processor 702 to generate the level indexes according to information of each data block of each level (such as the information of each data block of each level in the LSM structure) and information of each data file formed by the data blocks.

For the specific implementation of the steps in the program 710, refer to the corresponding description of the corresponding steps and units in the above-described data processing method embodiments, which are not further elaborated herein. Those skilled in the art could clearly understand that, for convenience and concise description, the corresponding process descriptions in the foregoing method embodiments may be referenced for the specific operation processes of the apparatus and modules described above, which are not further elaborated herein.

The electronic device of this embodiment uses a data block as a unit, stores data in fixed-sized data blocks at each level of the LSM structure, and performs data compaction of adjacent levels by comparing data blocks of adjacent levels to be merged. On the one hand, since the size of a data block is generally smaller than that of a data file, the probability of data overlapping is significantly lower for data blocks at adjacent levels. As data blocks without overlapping do not need a data compaction procedure for overlapping data that involves data read, data compaction, and data write, the lower data overlapping probability effectively reduces the system overheads caused by I/O data read and write and data comparison, thereby improving the system throughput. On the other hand, since data blocks of each level of the LSM structure have a fixed size, size determination and acquisition do not need to be performed for each data block, thereby greatly improving the data processing speed and efficiency.

It should be pointed out that depending on requirements of implementations, each component/step described in the embodiments of the present disclosure may be split into more components/steps, or two or more components/steps or some operations thereof may be combined as a new component/step to achieve the purpose of the embodiments of the present disclosure.

The above methods according to the embodiments of the present disclosure may be implemented in hardware or firmware, implemented as software or computer code that can be stored in a recording medium (such as CD ROM, RAM, floppy disk, hard disk, or magneto-optical disk), or implemented as computer code that is originally stored in a remote recording medium or a non-transitory machine-readable medium to be downloaded from a network and stored in a local recording medium, such that the methods described herein are performed by software stored on a recording medium of a machine using a general-purpose computer, a special-purpose processor, or programmable or special-purpose hardware (such as ASIC or FPGA). It is to be understood that a computer, processor, microprocessor controller, or programmable hardware includes a storage component capable of storing or receiving software or computer code (for example, RAM, ROM, flash memory, etc.). When accessed and executed by the computer, processor, or hardware, the software or computer code implements the data processing methods described herein. In addition, when a general-purpose computer accesses code for implementing the data processing methods disclosed herein, execution of the code converts the general-purpose computer into a special-purpose computer for executing the data processing methods disclosed herein.

A person of ordinary skill in the art could appreciate that the units and method steps of the examples described in connection with the embodiments disclosed herein may be implemented by electronic hardware or a combination of computer software and electronic hardware. Whether these functions are implemented by hardware or software depends on specific applications and design constraints of a technical solution. Professionals and technicians could use, for each specific application, a different method to implement the described functions, but such implementation should not be considered as going beyond the scope of the embodiments of the present disclosure.

The above implementations are merely used to illustrate the embodiments of the present disclosure, and are not intended to limit the embodiments of the present disclosure. Those of ordinary skills in the relevant technical field could also make, without departing from the spirit and scope of the embodiments of the present disclosure, various changes and modifications, so all equivalent technical solutions also fall within the scope of the embodiments of the present disclosure. The scope of protection of the embodiments of the present disclosure should be defined by the claims.

The present disclosure may further be understood with clauses as follows.

Clause 1. A data processing method, the method comprising:
  acquiring information of multiple first data blocks of a
    first level to be merged and information of multiple second data blocks of a second level to be merged, each of the data blocks of the first level having a same first size, each of the data blocks of the second level having a same second size;

performing, according to the information of the multiple first data blocks and the information of the multiple second data blocks, data comparison on each of the first data blocks and each of the second data blocks; and performing, according to a comparison result, data compaction on the first level and the second level.

Clause 2. The method according to clause 1, wherein:
the second level is a higher level adjacent to the first level; and
the second size is smaller than the first size.

Clause 3. The method according to clause 2, wherein the performing, according to the comparison result, data compaction on the first level and the second level comprises:
determining, according to the comparison result, whether a data overlapping exists between the multiple first data blocks and the multiple second data blocks; and
merging a first data block having overlapped data with an overlapping second data block, and reusing, in the second level, a first data block without overlapping.

Clause 4. The method according to clause 3, wherein the merging the first data block having overlapped data with the overlapping second data block comprises:
determining whether a data gap meeting a preset criteria exists in data of the first data block having overlapped data; and
in response to determining that the data gap meeting the preset criteria exists, dividing, according to the data gap, the first data block into at least two data blocks, and performing merging with the second data block; or
in response to determining that the data gap meeting the preset criteria does not exist, directly merging the first data block with the overlapping second data block.

Clause 5. The method according to any one of clauses 1-4, wherein both the first size and the second size are sizes meeting a preset data overlapping probability.

Clause 6. The method according to clause 5, wherein both the first size and the second size have a size range of 2M-16M.

Clause 7. The method according to any one of clauses 1-4, wherein:
both the first data blocks and the second data blocks are divided into data pages of a preset size according to a preset rule, and
the performing, according to the information of the multiple first data blocks and the information of the multiple second data blocks, data comparison on each of the first data blocks and each of the second data blocks comprises:
reading, according to the information of the multiple first data blocks and the information of the multiple second data blocks, data of each of the first data blocks and data of each of the second data blocks by using a data page as a unit; and
performing, according to a reading result, data comparison on each of the first data blocks and each of the second data blocks.

Clause 8. The method according to any one of clauses 1-4, wherein the acquiring the information of the multiple first data blocks of the first level to be merged and the information of the multiple second data blocks of the second level to be merged comprises:
acquiring, according to level indexes, the information of the multiple first data blocks of the first level to be merged and the information of the multiple second data blocks of the second level to be merged.

Clause 9. The method according to clause 8, further comprising:
generating the level indexes according to information of each data block of each level and information of each data file formed by data blocks.

Clause 10. A data processing apparatus, the apparatus comprising:
an acquisition module, configured to acquire information of multiple first data blocks of a first level to be merged and information of multiple second data blocks of a second level to be merged, wherein each of the data blocks of the first level has the same first size, and each of the data blocks of the second level has the same second size;
a comparison module, configured to perform, according to the information of the multiple first data blocks and the information of the multiple second data blocks, data comparison on each of the first data blocks and each of the second data blocks; and
a merging module, configured to perform, according to a comparison result, data compaction on the first level and the second level.

Clause 11. The apparatus according to clause 10, wherein:
the second level is a higher level adjacent to the first level; and the second size is smaller than the first size.

Clause 12. The apparatus according to clause 11, wherein the merging module comprises:
a determining module, configured to determine, according to a comparison result, whether a data overlapping exists between the multiple first data blocks and the multiple second data blocks; and
an execution module, configured to merge a first data block having overlapped data with an overlapping second data block, and reuse, in the second level, a first data block without overlapping.

Clause 13. The apparatus according to clause 12, wherein the execution module is configured to:
determine whether a data gap meeting a preset criteria exists in data of the first data block having overlapped data;
in response to determining that the data gap meeting the preset criteria exists, divide, according to the data gap, the first data block into at least two data blocks, and perform merging with the second data block; or
in response to determining that the data gap meeting the preset criteria does not exist, directly merge the first data block with the second data block; and reuse, in the second level, the first data block without overlapping.

Clause 14. The apparatus according to any one of clauses 10-13, wherein both the first size and the second size are sizes meeting a preset data overlapping probability.

Clause 15. The apparatus according to clause 14, wherein both the first size and the second size have a size range of 2M-16M.

Clause 16. The apparatus according to any one of clauses 10-13, wherein:
both the first data blocks and the second data blocks are divided into data pages of a preset size according to a preset rule, and
the comparison module is configured to read, according to the information of the multiple first data blocks and the information of the multiple second data blocks, data of each of the first data blocks and data of each of the second data blocks by using a data page as a unit; and
perform, according to a reading result, data comparison on each of the first data blocks and each of the second data blocks.

Clause 17. The apparatus according to any one of clauses 10-13, wherein the acquisition module is configured to acquire, according to level indexes, the information of the multiple first data blocks of the first level to be merged and the information of the multiple second data blocks of the second level be merged.

Clause 18. The apparatus according to clause 17, further comprising:
a generation module, configured to generate the level indexes according to information of each data block of each level and information of each data file formed by data blocks.

Clause 19. An electronic device, comprising: a processor, a memory, a communication interface, and a communication bus, wherein:
the processor, the memory, and the communication interface communicate with each other through the communication bus; and
the memory is configured to store at least one executable instruction, and the executable instruction causes the processor to perform acts corresponding to the data processing method according to any one of clauses 1-9.

Clause 20. A computer storage medium having a computer program stored thereon that, when executed by a processor, causes the processor to execute the data processing method according to any one of clauses 1-9.

What is claimed is:

1. A method comprising:
acquiring information of multiple first data blocks of a first level to be merged and information of multiple second data blocks of a second level to be merged, each of the multiple first data blocks of the first level having a same first size, each of the multiple second data blocks of the second level having a same second size, and the first size being different from the second size;
performing, according to the information of the multiple first data blocks and the information of the multiple second data blocks, data comparison on each of the multiple first data blocks and each of the multiple second data blocks;
performing, according to a comparison result, data compaction on the first level and the second level, wherein the performing, according to the comparison result, data compaction on the first level and the second level comprises:
determining, according to the comparison result, that a data overlapping exists between the multiple first data blocks and the multiple second data blocks; and
merging a first data block having overlapped data with an overlapping second data block, wherein the merging the first data block having overlapped data with the overlapping second data block comprises:
determining that a data gap meeting a preset criteria exists in data of the first data block having the overlapped data; and
dividing, according to the data gap, the first data block into at least two data blocks, and performing merging with the overlapping second data block; and
storing compacted data of each level in fixed-sized data blocks on a magnetic disk.

2. The method according to claim 1, wherein: the second level is a higher level adjacent to the first level.

3. The method according to claim 2, wherein the second size is smaller than the first size.

4. The method according to claim 1, wherein the performing, according to the comparison result, data compaction on the first level and the second level comprises:
determining, according to the comparison result, that a data overlapping does not exist between the multiple first data blocks and the multiple second data blocks; and
reusing, in the second level, a first data block without overlapping.

5. The method according to claim 1, wherein both the first size and the second size are sizes meeting a preset data overlapping probability.

6. The method according to claim 5, wherein both the first size and the second size have a size range of 2M-16M.

7. The method according to claim 1, wherein:
both the multiple first data blocks and the multiple second data blocks are divided into data pages of a preset size according to a preset rule.

8. The method according to claim 7, wherein:
the performing, according to the information of the multiple first data blocks and the information of the multiple second data blocks, data comparison on each of the multiple first data blocks and each of the multiple second data blocks comprises:
reading, according to the information of the multiple first data blocks and the information of the multiple second data blocks, data of each of the multiple first data blocks and data of each of the multiple second data blocks by using a data page as a unit; and
performing, according to a reading result, data comparison on each of the multiple first data blocks and each of the multiple second data blocks.

9. The method according to claim 1, wherein the acquiring the information of the multiple first data blocks of the first level to be merged and the information of the multiple second data blocks of the second level to be merged comprises:
acquiring, according to level indexes, the information of the multiple first data blocks of the first level to be merged and the information of the multiple second data blocks of the second level to be merged.

10. The method according to claim 9, further comprising:
generating the level indexes according to information of each data block of each level and information of each data file formed by data blocks.

11. An apparatus comprising:
one or more processors; and
one or more memories storing thereon computer-readable instructions that, when executed by the one or more processors, cause the one or more processors to perform acts comprising:
acquiring information of multiple first data blocks of a first level to be merged and information of multiple second data blocks of a second level to be merged, each of the multiple first data blocks of the first level having a same first size, each of the multiple second data blocks of the second level having a same second size, and the first size being different from the second size;
performing, according to the information of the multiple first data blocks and the information of the multiple second data blocks, data comparison on each of the multiple first data blocks and each of the multiple second data blocks;

performing, according to a comparison result, data compaction on the first level and the second level, wherein the performing, according to the comparison result, data compaction on the first level and the second level comprises:
determining, according to the comparison result, that a data overlapping exists between the multiple first data blocks and the multiple second data blocks; and
merging a first data block having overlapped data with an overlapping second data block, wherein the merging the first data block having overlapped data with the overlapping second data block comprises:
determining that a data gap meeting a preset criteria exists in data of the first data block having the overlapped data; and
dividing, according to the data gap, the first data block into at least two data blocks, and performing merging with the overlapping second data block; and
storing compacted data of each level in fixed-sized data blocks on a magnetic disk.

12. The apparatus according to claim 11, wherein:
the second level is a higher level adjacent to the first level; and
the second size is smaller than the first size.

13. The apparatus according to claim 11, wherein:
both the multiple first data blocks and the multiple second data blocks are divided into data pages of a preset size according to a preset rule, and
the performing, according to the information of the multiple first data blocks and the information of the multiple second data blocks, data comparison on each of the multiple first data blocks and each of the multiple second data blocks comprises:
reading, according to the information of the multiple first data blocks and the information of the multiple second data blocks, data of each of the multiple first data blocks and data of each of the multiple second data blocks by using a data page as a unit; and
performing, according to a reading result, data comparison on each of the multiple first data blocks and each of the multiple second data blocks.

14. The apparatus according to claim 11, wherein the acquiring the information of the multiple first data blocks of the first level to be merged and the information of the multiple second data blocks of the second level to be merged comprises:
acquiring, according to level indexes, the information of the multiple first data blocks of the first level to be merged and the information of the multiple second data blocks of the second level to be merged.

15. One or more memories storing thereon computer-readable instructions that, when executed by one or more processors, cause the one or more processors to perform acts comprising:
acquiring information of multiple first data blocks of a first level to be merged and information of multiple second data blocks of a second level to be merged, each of the first data blocks of the first level having a same first size, each of the second data blocks of the second level having a same second size, and the first size being different from the second size;
performing, according to the information of the multiple first data blocks and the information of the multiple second data blocks, data comparison on each of the multiple first data blocks and each of the multiple second data blocks;
performing, according to a comparison result, data compaction on the first level and the second level, wherein the performing, according to the comparison result, data compaction on the first level and the second level comprises:
determining, according to the comparison result, that a data overlapping exists between the multiple first data blocks and the multiple second data blocks; and
merging a first data block having overlapped data with an overlapping second data block, wherein the merging the first data block having overlapped data with the overlapping second data block comprises:
determining that a data gap meeting a preset criteria exists in data of the first data block having the overlapped data; and
dividing, according to the data gap, the first data block into at least two data blocks, and performing merging with the overlapping second data block; and
storing compacted data of each level in fixed-sized data blocks on a magnetic disk.

* * * * *